(12) United States Patent
Solomon et al.

(10) Patent No.: US 9,556,045 B2
(45) Date of Patent: Jan. 31, 2017

(54) USING POLYMER PARTICLES FOR OIL RECOVERY

(71) Applicant: Massachusetts Institute of Technology, Cambridge, MA (US)

(72) Inventors: Brian Richmond Solomon, Rockville, MD (US); Kripa K. Varanasi, Lexington, MA (US); Md Nasim Hyder, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/213,280

(22) Filed: Mar. 14, 2014

(65) Prior Publication Data

US 2015/0001153 A1 Jan. 1, 2015

Related U.S. Application Data

(60) Provisional application No. 61/792,960, filed on Mar. 15, 2013.

(51) Int. Cl.
| | |
|---|---|
| *C02F 1/68* | (2006.01) |
| *C11D 3/20* | (2006.01) |
| *C02F 1/28* | (2006.01) |
| *B01J 20/26* | (2006.01) |
| *B01J 20/28* | (2006.01) |
| *C09K 3/32* | (2006.01) |
| *C02F 101/32* | (2006.01) |
| *C02F 103/00* | (2006.01) |
| *C02F 103/08* | (2006.01) |

(52) U.S. Cl.
CPC .............. *C02F 1/681* (2013.01); *B01J 20/261* (2013.01); *B01J 20/262* (2013.01); *B01J 20/28019* (2013.01); *B01J 20/28078* (2013.01); *C02F 1/285* (2013.01); *C09K 3/32* (2013.01); *C11D 3/20* (2013.01); *C02F 2101/32* (2013.01); *C02F 2101/325* (2013.01); *C02F 2103/007* (2013.01); *C02F 2103/08* (2013.01); *C02F 2303/16* (2013.01)

(58) Field of Classification Search
None
See application file for complete search history.

(56) References Cited

U.S. PATENT DOCUMENTS

| | | | | |
|---|---|---|---|---|
| 3,617,556 | A * | 11/1971 | Cole | E02B 15/103 |
| | | | | 210/242.4 |
| 5,215,407 | A * | 6/1993 | Brelsford | E02B 15/041 |
| | | | | 210/242.4 |
| 5,281,463 | A * | 1/1994 | Cotton | C09K 3/32 |
| | | | | 405/63 |
| 5,492,881 | A * | 2/1996 | Diamond | B01J 20/30 |
| | | | | 502/401 |

(Continued)

*Primary Examiner* — Chester Barry
(74) *Attorney, Agent, or Firm* — Steptoe & Johnson LLP

(57) ABSTRACT

The invention provides methods that use particles comprising a polymer to absorb and recover oil. The methods can be used for oil spill cleanup, oil recovery, extraction of oil from an oil-water emulsion, etc. In some embodiments, the particles are distributed to an oil spill site or another environment where oil needs to be separated. The particles may be retrieved after they have absorbed oil from the oil spill site. The oil may then be retrieved from the particles by compressing the particles or via other suitable oil removal methods.

41 Claims, 4 Drawing Sheets

(56) References Cited

U.S. PATENT DOCUMENTS

| | | | |
|---|---|---|---|
| 2005/0281999 A1* | 12/2005 | Hofmann | B32B 5/18 |
| | | | 428/304.4 |
| 2007/0066795 A1* | 3/2007 | Cravey | B01F 17/005 |
| | | | 528/310 |
| 2009/0250400 A1* | 10/2009 | Schmitt | B01J 20/183 |
| | | | 210/693 |
| 2012/0094360 A1* | 4/2012 | Fuhrer | C12N 1/26 |
| | | | 435/253.6 |
| 2013/0168323 A1* | 7/2013 | Soane | B01D 17/0202 |
| | | | 210/691 |

* cited by examiner

USING POLYMER PARTICLES FOR OIL RECOVERY

CROSS REFERENCE TO RELATED APPLICATIONS

This application claims priority to and the benefit of, and incorporates herein by reference in its entirety, U.S. Provisional Patent Application No. 61/792,960, which was filed on Mar. 15, 2013 and titled "Polymer Particles and Methods of Using These for Oil Recovery."

FIELD OF INVENTION

This invention relates generally to articles, devices, and methods for oil recovery and cleanup, and, in particular, in some embodiments, to articles, devices, and methods using polymer particles for oil recovery and cleanup and for removal of oil from oil-water emulsions to provide clean water that is sufficiently free from oil.

BACKGROUND

Separation of oil and water mixtures (e.g., oil-water emulsions or other mixtures where oil is suspended or otherwise present in water) is of great importance across a wide range of technologies and industries. As highlighted by the 2010 Gulf oil spill and subsequent cleanup efforts, there is a need in the art for oil recovery and separation technologies that are fast, efficient, and environmentally friendly. There is a need for separation technologies that can separate water droplets from water-in-oil emulsions and that can separate oil from oil-in-water emulsions (e.g., to comply with government regulations regarding the amount of oil in water that is discharged back into the environment). The petroleum industry faces similar challenges as it attempts to extract oil from beneath the sea or simply to extract oil from oil-water emulsions.

Existing separation devices and methods are either environmentally unfriendly, extremely energy intensive, or incapable of performing the desired separations (or a combination of these). For example, in deep sea oil extraction, one energy-intensive conventional approach is to pump oil emulsified in water from the ocean floor to the surface where it is stored it in gravity separation tanks. In addition, once much of the water has been removed from the oil, existing techniques (e.g., ultracentrifugation) are incapable of removing additional, trace amounts of water that remain. These trace amounts of water in oil may cause significant problems for end users, process equipment, and machinery. In addition, conventional techniques are incapable of removing trace amounts of oil from water—and these trace amounts of oil in water can cause significant problems for end users. In addition, only water with oil levels below a predetermined threshold may be discharged into the environment after cleaning. Current separation techniques are therefore inefficient and/or incapable of performing the wide range of oil and water separations of interest.

In recent years, growing environmental concerns have fueled the need for efficient separation of oil-water mixtures. Oil spills, as highlighted by the Deepwater Horizon spills, have lasting detrimental ecological effects. The threat is recurring and persistent; every year over 20,000 oil spills are reported to the U.S. government. Aside from such disasters, fats, oils, and grease are classified as hazardous waste and their removal (e.g., from water before the water being released into the environment) is subject to increasingly more stringent governmental regulation. Generally, according to U.S. regulations, water needs to be cleaned to about 10 ppm of oil or less prior to being discharged.

There is a need for more efficient and more environmentally-friendly devices and methods for separating oil and water mixtures. In particular, a need exists for separating trace amounts of water from oil and water mixtures. In addition, a need exists for separating oil (including trace amounts of oil) from water without removing large quantities of water—e.g., there is a need for devices and methods capable of separating oil from water locally. Moreover, there is a need for devices and methods capable of separating oil from water to obtain water that does not include oil or includes only such an amount of oil as is acceptable to comply with government regulations for discharging water back into the environment. Oil-contaminated water is a serious environmental problem, and fast and efficient methods are needed to remove oil from water, e.g., after an oil spill.

SUMMARY OF THE INVENTION

Various embodiments of the invention relate to devices and methods useful for oil recovery and separating oil from water (e.g., for oil recovery and/or for cleaning water from oil). Various embodiments may be useful, for example, for oil cleanup—e.g., to remove the oil from water after an oil spill. In some embodiments, porous particles that absorb oil are formed. In some embodiments, the porous particles are formed from polysulfone and poly(vinylpyrrolidone) and/or other polymers and/or pore formers. In some embodiments, after fabrication, the pores of the particles include only air prior to being introduced into an oil-containing environment (e.g., oil-water emulsion). Once the particles contact oil (e.g., crude oil, mineral oil), in certain embodiments, the oil spontaneously wets the particles, displacing the air in the pores and filling the pores of the particles, causing the oil to be trapped in the particles. The water is inhibited from penetrating the pores of the particles because the particles are hydrophobic. In some embodiments, the particles are hydrophobic and oleophilic. After the particles have absorbed the oil, the particles are, in some embodiments, removed from the solution. The oil may then be removed from the particles by any suitable methods, such as by compressing the particles. In some embodiments, the particles may be reused multiple times.

Embodiments discussed herein relate to fast and effective methods for removing oil from, e.g., oil-water emulsions. The particles discussed in some embodiments can be made very quickly (e.g., the particles form in about a second once they contact water); thus, the particles may be deployed very quickly to an oil spill site to help contain the oil spill to a small and bounded area and prevent spreading of the oil to a larger area, which is dangerous and harmful for the environment. Moreover, the particles themselves may be easily contained to the area of the oil spill site by use of simple mechanical methods such as nets—in order to prevent the particles from being lost or released into the environment.

In one aspect, the invention provides a method of oil spill cleanup, the method including: (a) providing particles comprising a polymer; (b) distributing the particles at an oil spill site; and (c) retrieving the particles after they have absorbed oil from the oil spill site.

In some embodiments, the particles are distributed from the air above the oil spill site. In some embodiments, the oil spill site is located offshore. In some embodiments, the method also includes recovering absorbed oil from the retrieved particles.

In some embodiments, the step of recovering includes extracting absorbed oil from the retrieved particles (e.g., by compressing the retrieved particles).

In some embodiments, the particles are substantially spherical or ellipsoidal. In some embodiments, the particles are oblate spheroids.

In some embodiments, the particles float at the surface of the oil spill site. In some embodiments, the step of retrieving includes collecting particles from the surface of the oil spill site.

In some embodiments, the particles have an average pore size from about 100 nm to about 4 µm. In some embodiments, the particles have an average pore size from about 300 nm to about 2 µm. In some embodiments, the particles have an average pore size from about 500 nm to about 1 µm. In some embodiments, the particles have an average size of from about 0.1 mm to about 30 mm. In some embodiments, the particles have an average size of from about 0.1 mm to about 10 mm. In some embodiments, the particles have an average size of from about 0.5 mm to about 50 mm.

In some embodiments, the particles are substantially spherical and the average size is based on an average diameter. In some embodiments, the particles are substantially ellipsoidal and the average size is based on an average length of the major axis.

In some embodiments, the particles are hydrophobic and oleophilic.

In some embodiments, the polymer is selected from the group consisting of polysulfone (PSF), poly(vinylpyrrolidone) (PVP), polyacrylonitrile (PAN), polycarbonate, polyethersulfone (PES), and any combination thereof. In some embodiments, the polymer comprises polysulfone (PSF). In some embodiments, the polymer includes poly(vinylpyrrolidone) (PVP). In some embodiments, the polymer comprises polyacrylonitrile (PAN). In some embodiments, the polymer includes polycarbonate. In some embodiments, the polymer includes polyethersulfone (PES).

In some embodiments, the particles are porous polysulfone (PSF) particles.

In one aspect, the invention provides a method of oil recovery, the method including: (a) providing particles comprising a polymer; (b) distributing the particles at a location that contains oil; and (c) retrieving the particles after they have absorbed oil from the location.

In some embodiments, the location is an oil well. In some embodiments, the oil well is an offshore oil well. In some embodiments. the oil well is at least 0.5 km below the surface. In some embodiments, the oil well is at least 1 km below the surface. In some embodiments, the oil well is at least 2 km below the surface. In some embodiments, the oil well is at least 3 km below the surface.

In some embodiments, the method further includes recovering absorbed oil from the retrieved particles (e.g., by compressing the retrieved particles). In some embodiments, the step of recovering includes extracting absorbed oil from the particles below the surface. In some embodiments, the method further includes pumping the recovered oil to the surface.

In some embodiments, the particles are substantially spherical or ellipsoidal. In some embodiments, the particles are oblate spheroids.

In some embodiments, the particles have an average pore size from about 100 nm to about 4 µm. In some embodiments, the particles have an average pore size from about 300 nm to about 2 µm. In some embodiments, the particles have an average pore size from about 500 nm to about 1 µm. In some embodiments, the particles have an average size of from about 0.1 mm to about 30 mm. In some embodiments, the particles have an average size of from about 0.1 mm to about 10 mm. In some embodiments, the particles have an average size of from about 0.5 mm to about 50 mm.

In some embodiments, the particles are substantially spherical and the average size is based on an average diameter. In some embodiments, the particles are substantially ellipsoidal and the average size is based on an average length of the major axis.

In some embodiments, the particles are hydrophobic and oleophilic.

In some embodiments, the polymer is selected from the group consisting of polysulfone (PSF), poly(vinylpyrrolidone) (PVP), polyacrylonitrile (PAN), polycarbonate polyethersulfone (PES), and any combination thereof. In some embodiments, the polymer comprises polysulfone (PSF). In some embodiments, the polymer comprises poly(vinylpyrrolidone) (PVP). In some embodiments, the polymer comprises polyacrylonitrile (PAN). In some embodiments, the polymer comprises polycarbonate. In some embodiments, the polymer comprises polyethersulfone (PES). In some embodiments, the particles are porous polysulfone (PSF) particles.

In one aspect, the invention provides a method of extracting oil from an oil-water emulsion, the method comprising: (a) providing particles comprising a polymer; (b) distributing the particles to create a fluidized bed of particles; and (c) pumping an oil-water emulsion through the fluidized bed of particles.

In some embodiments, the method also includes retrieving the particles after they have absorbed oil from the oil-water emulsion. In some embodiments, the method also includes recovering absorbed oil from the retrieved particles. In some embodiments, the step of recovering comprises extracting absorbed oil from the retrieved particles (e.g., by compressing the retrieved particles).

In some embodiments, the particles are substantially spherical or ellipsoidal. In some embodiments, the particles are oblate spheroids.

In some embodiments, the particles have an average pore size from about 100 nm to about 4 µm. In some embodiments, the particles have an average pore size from about 300 nm to about 2 µm. In some embodiments, the particles have an average pore size from about 500 nm to about 1 µm. In some embodiments, the particles have an average size of from about 0.1 mm to about 30 mm. In some embodiments, the particles have an average size of from about 0.1 mm to about 10 mm. In some embodiments, the particles have an average size of from about 0.5 mm to about 50 mm.

In some embodiments, the particles are substantially spherical and the average size is based on an average diameter. In some embodiments, the particles are substantially ellipsoidal and the average size is based on an average length of the major axis.

In some embodiments, the polymer is selected from the group consisting of polysulfone (PSF), poly(vinylpyrrolidone) (PVP), polyacrylonitrile (PAN), polycarbonate, polyethersulfone (PES), and any combination thereof. In some embodiments, the polymer comprises polysulfone (PSF). In some embodiments, the polymer comprises poly(vinylpyrrolidone) (PVP). In some embodiments, the polymer comprises polyacrylonitrile (PAN). In some embodiments, the polymer comprises polycarbonate. In some embodiments, the polymer comprises polyethersulfone (PES). In some embodiments, the particles are porous polysulfone (PSF) particles.

Elements of embodiments described with respect to a given aspect of the invention may be used in various embodiments of another aspect of the invention. For example, it is contemplated that features of dependent claims depending from one independent claim can be used in apparatus and/or methods of any of the other independent claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

While the invention is particularly shown and described herein with reference to specific examples and specific embodiments, it should be understood by those skilled in the art that various changes in form and detail may be made therein without departing from the spirit and scope of the invention.

DESCRIPTION

Figure 1:
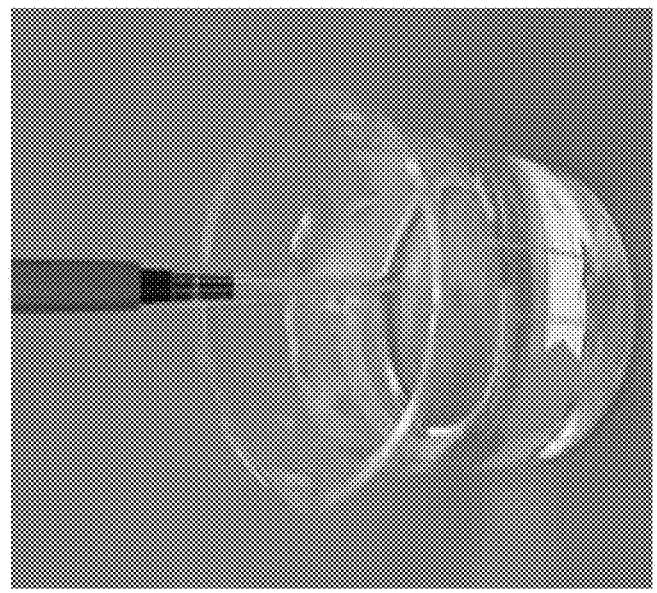
FIG. 1 is a photograph of polysulfone being dropped into a container with water, in accordance with an exemplary embodiment of the invention.

It is contemplated that articles, apparatus, methods, and processes of the claimed invention encompass variations and adaptations developed using information from the embodiments described herein. Adaptation and/or modification of the articles, apparatus, methods, and processes described herein may be performed by those of ordinary skill in the relevant art.

Throughout the description, where articles and apparatus are described as having, including, or comprising specific components, or where processes and methods are described as having, including, or comprising specific steps, it is contemplated that, additionally, there are articles and apparatus of the present invention that consist essentially of, or consist of, the recited components, and that there are processes and methods according to the present invention that consist essentially of, or consist of, the recited processing steps.

It should be understood that the order of steps or order for performing certain actions is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

Methods

In some embodiments, the invention provides methods that use particles comprising a polymer to absorb and recover oil. The methods can be used for oil spill cleanup, oil recovery, extraction of oil from an oil-water emulsion, and any other applications where separation of oil from water is desired, etc.

In one aspect, the invention provides a method of oil spill cleanup, the method comprising: (a) providing particles comprising a polymer; (b) distributing the particles at an oil spill site; and (c) retrieving the particles after they have absorbed oil from the oil spill site.

In some embodiments, the particles are distributed from the air above the oil spill site (e.g., using a plane or helicopter or simply by spraying them from a site adjacent to the oil spill site). In some embodiments, the oil spill site is offshore (e.g., on an ocean or sea). In some embodiments, the oil spill site is on land.

In some embodiments, the absorbed oil is then recovered from the retrieved particles. For example, the oil may be extracted from the retrieved particles by compressing the particles.

In some embodiments, the particles float at the surface of the oil spill site. This can be advantageous since it facilitates the retrieval of the particles, e.g., they are readily collected from the surface of the oil spill site.

In some embodiments, the particles are collected from an oil spill site or another location where separation of oil from water is desired with a net (similar to a metal wire mesh or fabric that has effective wire spacing smaller than the particles size). In some embodiments, the particles are collected from a location where oil and water separation is desired by any other device that has pores or openings that are smaller than the size of the particles. Some conventional methods use skimmers to directly scrape oil from the surface, but skimmers take in a significant amount of water and cannot be deployed as easily as a net.

In one aspect, the invention provides a method of oil recovery, the method including: (a) providing particles including a polymer; (b) distributing the particles at a location that contains oil; and (c) retrieving the particles after they have absorbed oil from the location.

In some embodiments, the location is an oil well. The oil well could be offshore or on land. In some embodiments, the oil well is a deep oil well, e.g., located at least 0.5 km, at least 1 km, at least 2 km or at least 3 km below the surface.

In some embodiments, the absorbed oil is recovered from the retrieved particles. For example, the oil may be extracted from the retrieved particles by compressing the particles. In some embodiments, the absorbed oil is extracted from the particles below the surface and the recovered oil is then pumped to the surface. This would be particularly advantageous in the context of deep sea oil wells where the leading method for recovery is to pump oil emulsified in water to the surface and store it in gravity separation tanks Pumping the complete emulsion to the surface requires substantially more power than pumping the oil alone.

In one aspect, the invention provides a method of extracting oil from an oil-water emulsion, the method including: (a) providing particles comprising a polymer; (b) distributing the particles to create a fluidized bed of particles; and (c) pumping an oil-water emulsion through the fluidized bed of particles.

Particles

In general the particles may have any shape, dimension and porosity.

In some embodiments, the particles are substantially spherical or substantially ellipsoidal. In some embodiments, the particles are spherical. In some embodiments, the particles are ellipsoidal. In some embodiments, the particles are oblate spheroids. In some embodiments, the particles have a platelet-like shape.

Small particles exhibit extremely high surface to volume ratios, thus enabling efficient oil absorption. Absorption of liquid in porous material is expressed as total liquid volume (TLV) absorbed per unit area according to Lucas-Washburn equation:

$$TLV = \varepsilon \sqrt{\frac{R \cdot \gamma \cdot \cos\theta \cdot t}{2\mu}} \quad (1)$$

where $\varepsilon$ is the void fraction of the porous particle, R is the pore radius, $\gamma$ is the surface tension of the fluid, $\theta$ is the contact angle, t is the penetrating time and $\mu$ is the fluid viscosity, as described in Edward W. Washburn (1921), "The Dynamics of Capillary Flow," *Physical Review* 17 (3): 273.

For example, a 2 mm (diameter) PSf particle shows an absorption volume (TLV) of 10.7 to 15.3 (cm$^3$/cm$^2$) for mineral oil with viscosity 3 mPa·s, depending on the time allowed for the oil to penetrate the pores of the particles.

Additionally, small particles can be efficiently produced in mass. In some embodiments, a large number of particles (e.g., more than 10, more than 50, more than 100, more than 200, more than 500, more than 1000, etc.) are produced at the same time. In some embodiments, the large number of particles are produced in situ at the same time. In some embodiments, the large number of particles are released into an oil-water emulsion at the same time for absorption of oil. In some embodiments, the number of particles that is generated at the same time is based on an estimated quantity of the oil to be removed from water.

In some embodiments, the thickness of the particle is between about 80 and about 450 µ. In some embodiments, the thickness of the particle is tunable based on the polymer molecular weight, polymer concentration, the solvent used, and the concentration of a pore forming agent. In some embodiments, the pore forming agent includes or is a hydrophilic polymer. In some embodiments, the pore forming agent is poly(vinylpyrrolidone) (PVP).

In some embodiment, where a pore forming agent (e.g., PVP or another pore forming agent) is used, the particle has a bi-layer architecture. In some embodiments, thickness of the top layer (that is in contact with the fluid, e.g., oil) is between about 0.2 and about 2.5 µm. In some embodiments, the top layer is porous with pore size of between about 30 and about 80 nm in diameter. In some embodiments, the top layers has pores that are interconnected. In some embodiments, the bottom layer has a thickness between about 78 and about 447 µm. In some embodiments, the bottom layer has pores that are interconnected. In some embodiments, the particle has an open-cell structure.

In some embodiments, where a pore forming agent is not used, the particle is a single layer microstructure with porosity between about 200 nm to about 500 nm, depending on the molecular weight and the concentration of the polymer. In some embodiments, the particle has interconnected pores.

In some embodiments, the particles have an average size of from about 0.1 mm to about 30 mm, e.g., from about 0.1 mm to about 10 mm or from about 0.5 mm to about 50 mm. When the particles are substantially spherical, the average size is based on an average diameter. When the particles are substantially ellipsoidal, the average size is based on an average length of the major axis.

In some embodiments, the particles have an average pore size from about 100 nm to about 4 µm, e.g., from about 300 nm to about 2 µm or from about 500 nm to about 1 µm. In some embodiments, the particles have any pore size suitable or desirable for a particular application.

In some embodiments, the particles are hydrophobic (e.g., do not allow water to penetrate the pores of the particles) and oleophilic (e.g., allow oil to penetrate the pores of the particles).

In some embodiments, the particles include a polymer selected from the group consisting of polysulfone (PSF), poly(vinylpyrrolidone) (PVP), polyacrylonitrile (PAN), polycarbonate, polyethersulfone (PES), and any combination thereof.

In some embodiments, the particles include polysulfone (PSF). In some embodiments, the particles include poly (vinylpyrrolidone) (PVP). In some embodiments, the particles include polyacrylonitrile (PAN). In some embodiments, the particles include polycarbonate. In some embodiments, the particles include polyethersulfone (PES). In some embodiments, the particles are porous polysulfone (PSF) particles.

In some embodiments, the pore forming agent is selected from PVP, polyvinyl glycol, polyvinyl alcohol, polyacrylic acid, chitosan, block co-polymers including polystyrene b-polyethylene glycol, polyethylene glycol-b-polylysine, that would allow for precise control of the top layer thickness of the porous particles.

Formation of Particles

In some embodiments, the particles are prepared using the same solution of polymer in dimethyl acetamide (DMAc) using phase inversion process (e.g., immersion precipitation) as the membranes prepared in U.S. Non-Provisional Application Ser. No. 13/781,601, filed on Feb. 28, 2013, titled "Hierarchical Porous Membrane for Emulsion Separation," and incorporated herein by reference in its entirety. In some embodiments, the particles can be formed instantaneously when a drop of solvent (DMAc) containing the polymer (PES) comes in contact with the non-solvent(water).

In some embodiments, a method of preparing the particles uses the following ingredients: a polymer (e.g., polysulfone (PSf) or polyacrylonitrile (PAN)); a solvent (e.g., organic, such as Dimethyl acetamide (DMAc) or n-methyl-2-pyrrolidone (NMP)); a non-solvent (e.g., DI water or a mixture of water/ethanol: 90/10); and a pore former (e.g., poly(vinylpyrrolidone) (PVP) or Poly ethylene glycol (PEG) or a mixture of PVP/PEG (50/50)).

In some embodiments, the porous particles are prepared using a phase inversion technique based on a non-solvent induced phase separation method. A mixture of 7 g PSF and 3 g poly(vinylpyrrolidone) (PVP) is dissolved in 40 mL DMAc at 80° C. to form a homogeneous solution, which is then left at 50° C. for 12 hours to allow air bubbles to be released (and for the pores to form). Rather than doctor blading a solution onto a glass slide, the solution is then placed into a syringe. A drop of the solution is pushed out from the syringe and allowed to land in a bath of water. Upon contact with the water, the spongy polymer matrix begins to form.

In the conducted experiments, the particles hardened very quickly such that all of the solution could be pushed from the syringe in a continuous fashion and the particles could then be recovered from the bath solution. In some embodiments, particles harden in about 1 second.

In some embodiments, the formation of the particles can be accomplished in-situ (e.g., at the location of the oil spill or at or in the vicinity of the location where the oil-water emulsion is present), where the polymer solution is poured into the water and begins to harden. In some embodiments, the polymer solution needs to be in contact with water for the phase inversion process to occur (e.g., in some embodiments, the polymer solution cannot be poured directly into the oil).

In some embodiments, the process of manufacturing the particles and removing oil from water may be scaled to large scale (e.g., to remove oil from water in case of an oil spill). In some embodiments, for example, multiple syringes or other similar applicators push droplets of solution to cure in a large container (e.g., bath, pool, etc.).

In some embodiments, the particles are naturally oleophilic (e.g., the pores become spontaneously filled by oil) and hydrophobic (e.g., the particles repel water droplets and do now allow the water to enter or fill the particles' pores). This allows the oil to pass fill the particles' pores and for water to be blocked or stopped. In some embodiments, the ability of the particles to allow oil to fill the particles but not water is due at least in part to the particles' structure.

In some embodiments, the particles are deposited into a location where oil needs to be separated from water and removed—e.g., a location where an oil spill took place. The particles absorb the oil and do not absorb the water. After a predetermined amount of time, the particles are removed from the site.

In some embodiments, the particles are then processed prior to removal of the oil. In some embodiments, the particles undergo a washing and/or drying process to remove excess water (or another substance) from the surface the particles (e.g., to obtain oil that is substantially free from impurities such as salt and/or other impurities present in water).

In some embodiments, the oil is removed from the particles by any suitable process, such as by compressing the particles. In some embodiments, the particles are placed into a container and a piston can compress them to remove the oil. In some embodiments, the polymer has elasticity properties that allow for the oil to be pushed out of the particles without compromising the particles' pore network.

In some embodiments, the particles are reusable. In some embodiments, the particles, after being compressed, are re-dissolved in DMAc. The particles can then be generated again by the process described above.

EXAMPLES

The following describes some experiments that were performed to prepare and test some exemplary particles of the invention.

To begin, 7 g polysulfone (PSF) and 3 g poly(vinylpyrrolidone) (PVP) were dissolved in 40 mL DMAc at 80° C. to form a homogeneous solution, which was then left at 50° C. for 12 hours in order for air bubbles to be released. Using a hand syringe, the solution was dropped from a sufficient height into a water bath (as shown, for example, in FIG. 1). On impact, the spherical drops collapsed and became oblate spheroids. Upon contact with the water, polysulfone cured and became hardened in the ellipsoid shape. To wash away remaining additive, the particles were rinsed with additional water.

The shape and size of the particles could be controlled by changing the size of the syringe needles. Two readily available needles were used to produce two different sized particles. The ellipsoidal shape of the particles was a result of the spherical drop being flattened upon impact with the water's surface. In practice, reducing the surface tension of the water (via bubbling or incorporation of a surfactant monolayer) will cause the resulting particles to be more spherical. The height at which the particles are dropped also affects their shape. Drops that fall longer produce flatter ellipsoids.

Figure 2:
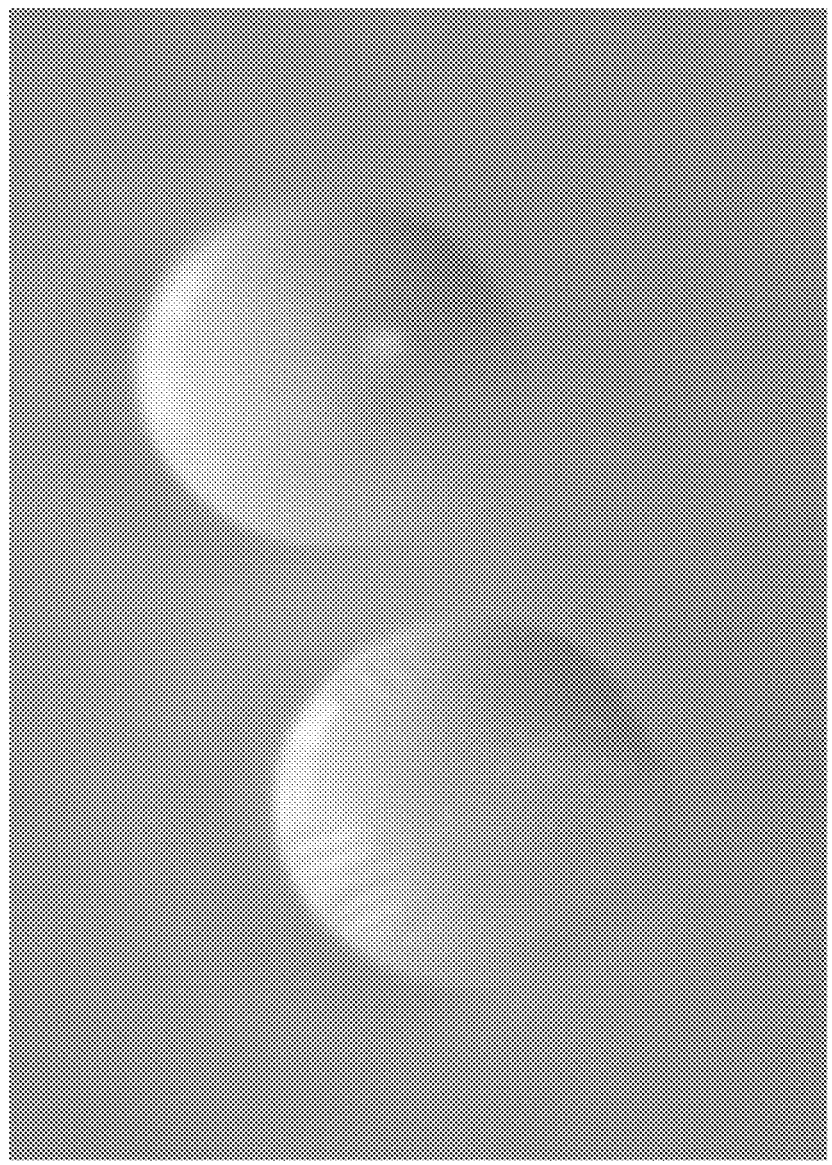
FIG. 2 is a photograph of two ellipsoidal particles measuring 1.5 mm across the major axis, in accordance with an exemplary embodiment of the invention.
Figure 3:
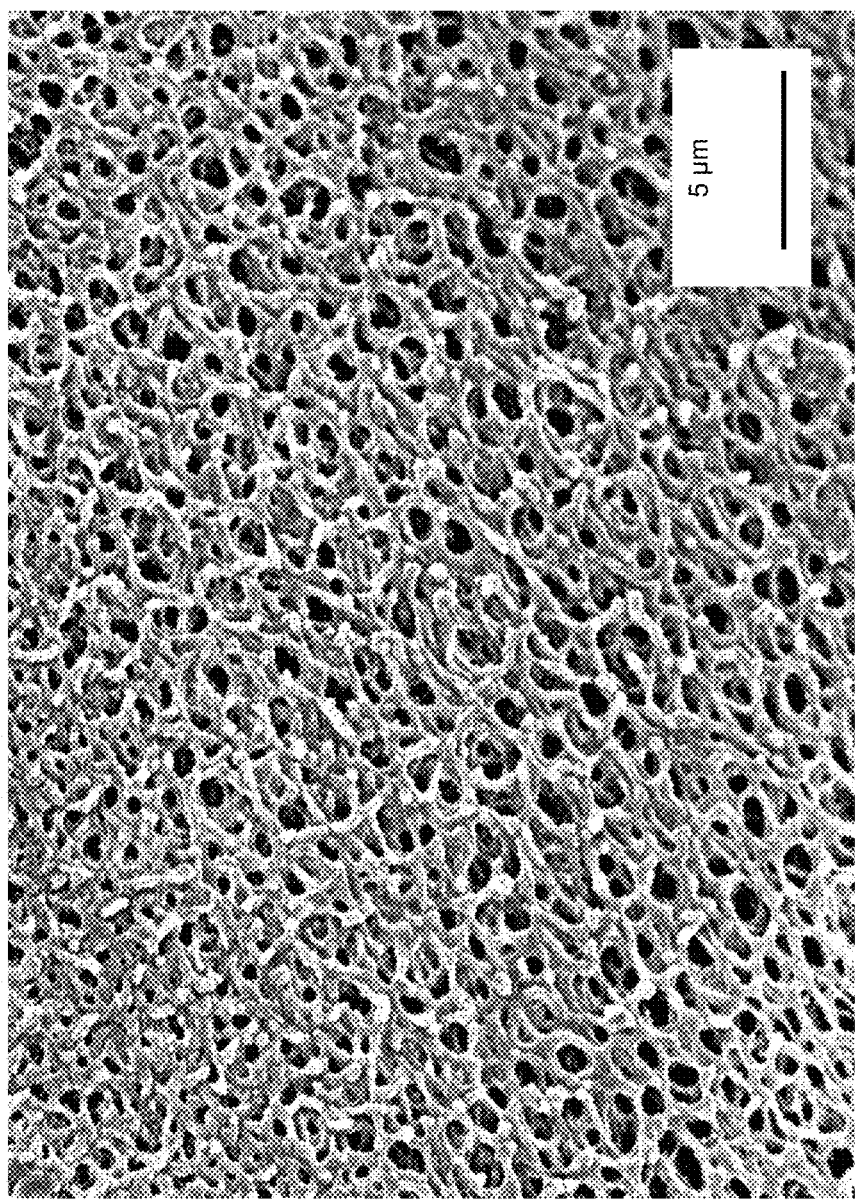
FIG. 3 is an SEM image showing the porous structure of the particles prepared according to an exemplary embodiment of the invention.

Images of some exemplary particles that were oblate spheroids measuring approximately 1.5 mm across the major axis are shown in FIG. 2. SEM images revealed a microporous structure (as shown in FIG. 3). Pores ranged from 100 nm to 4 µm in diameter.

Figure 4:
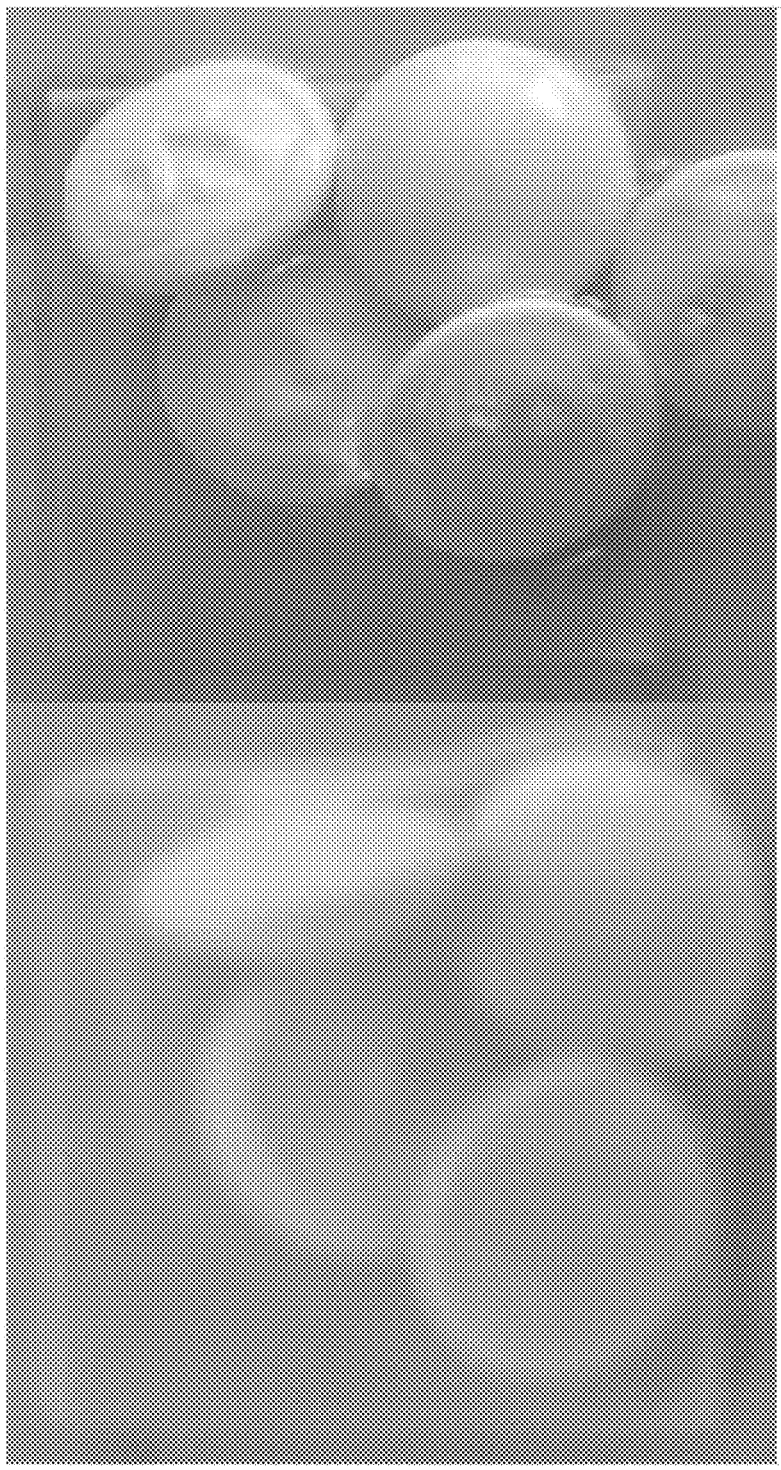
FIG. 4 shows an image of particles contacted with a surface covered in orange mineral oil (left). After thirty minutes, the orange mineral oil was no longer visible and had penetrated into the pores of the particles as shown in the image on the right of FIG. 4.

In order to demonstrate the ability of the particles to absorb oil, these exemplary particles were contacted with mineral oil. Particles were contacted with a surface covered in orange mineral oil (FIG. 4). Oil spontaneously wetted the surface of the particles. After sufficient time, the oil was no longer visible and had penetrated into the pores of the particles. This experiment was conduction over the course of one hour.

Without wishing to be limited to any particular theory, after fabrication, the pores of the particles contain only air. When submersed in water, water is unable to penetrate the pores. This is because the particles are hydrophobic and thus water would need to be pressurized beyond the capillary pressure of the pores to enter the particle.

As a result, the particles float in water. When the particles come into contact with oil, the oil spontaneously wets the particles. As a result, oil displaces the air in the pores and fills the pores of the particle. The oil is then trapped in the particle.

Even when full of oil, the particles float. The oil can later be recovered by retrieving and compressing the particles. In some embodiments, from a 2 mm (diameter) PSf particle, about 67% of the absorbed oil can be extracted without breaking/collapsing the particle. However, the oil removal can be improved (e.g., more than 67%, more than 70%, more than 75%, more than 80%, more than 85%, more than 90%, more than 95%, more than 99% of the absorbed oil can be extracted without breaking/collapsing the particle) if the particles can be made with flexible polymer, such as polyvinyl alcohol or polydimethyl siloxanes.

OTHER EMBODIMENTS

Embodiments and examples described herein are for illustrative purposes only. The scope of the invention is illustrated by the claims and appendices attached hereto. Various changes and modifications within the scope of the invention will be apparent to those skilled in the art.

What is claimed is:

1. A method of oil spill cleanup, the method comprising:
   (a) providing particles comprising a polymer, wherein the polymer comprises polysulfone (PSF);
   (b) distributing the particles at an oil spill site; and
   (c) retrieving the particles after they have absorbed oil from the oil spill site.
2. The method of claim 1, wherein the particles are distributed from the air above the oil spill site.

3. The method of claim 1, wherein the oil spill site is offshore.

4. The method of claim 1 further comprising recovering absorbed oil from the retrieved particles.

5. The method of claim 4, wherein the step of recovering comprises extracting absorbed oil from the retrieved particles (e.g., by compressing the retrieved particles).

6. The method of claim 1, wherein the particles are substantially spherical or ellipsoidal.

7. The method of claim 1, wherein the particles are oblate spheroids.

8. The method of claim 1, wherein the particles float at the surface of the oil spill site.

9. The method of claim 8, wherein the step of retrieving comprises collecting particles from the surface of the oil spill site.

10. The method of claim 1, wherein the particles have an average pore size from about 100 nm to about 4 μm.

11. The method of claim 1, wherein the particles have an average size of from about 0.5 mm to about 50 mm.

12. The method of claim 11, wherein the particles are substantially spherical and the average size is based on an average diameter.

13. The method of claim 11, wherein the particles are substantially ellipsoidal and the average size is based on an average length of the major axis.

14. The method of claim 1, wherein the particles are hydrophobic and oleophilic.

15. A method of oil recovery, the method comprising:
(a) providing particles comprising a polymer, wherein the polymer comprises polysulfone (PSF);
(b) distributing the particles at a location that contains oil; and
(c) retrieving the particles after they have absorbed oil from the location.

16. The method of claim 15, wherein the location is an oil well.

17. The method of claim 16, wherein the oil well is at least 0.5 km below the surface.

18. The method of claim 16, wherein the oil well is at least 1-3 km below the surface.

19. The method of claim 15 further comprising recovering absorbed oil from the retrieved particles (e.g., by compressing the retrieved particles).

20. The method of claim 19, wherein the step of recovering comprises extracting absorbed oil from the particles below the surface.

21. The method of claim 20 further comprising pumping the recovered oil to the surface.

22. The method of claim 15, wherein the particles are substantially spherical or ellipsoidal.

23. The method of claim 15, wherein the particles are oblate spheroids.

24. The method of claim 15, wherein the particles have an average pore size from about 100 nm to about 4 μm.

25. The method of claim 15, wherein the particles have an average size of from about 0.5 mm to about 50 mm.

26. The method of claim 25, wherein the particles are substantially spherical and the average size is based on an average diameter.

27. The method of claim 25, wherein the particles are substantially ellipsoidal and the average size is based on an average length of the major axis.

28. The method of claim 15, wherein the particles are hydrophobic and oleophilic.

29. A method of extracting oil from an oil-water emulsion, the method comprising:
(a) providing particles comprising a polymer;
(b) distributing the particles to create a fluidized bed of particles; and
(c) pumping an oil-water emulsion through the fluidized bed of particles.

30. The method of claim 29 further comprising retrieving the particles after they have absorbed oil from the oil-water emulsion.

31. The method of claim 30 further comprising recovering absorbed oil from the retrieved particles.

32. The method of claim 31, wherein the step of recovering comprises extracting absorbed oil from the retrieved particles (e.g., by compressing the retrieved particles).

33. The method of claim 29, wherein the particles are substantially spherical or ellipsoidal.

34. The method of claim 29, wherein the particles are oblate spheroids.

35. The method of claim 29, wherein the particles have an average pore size from about 100 nm to about 4 μm.

36. The method of claim 29, wherein the particles have an average size of from about 0.5 mm to about 50 mm.

37. The method of claim 36, wherein the particles are substantially spherical and the average size is based on an average diameter.

38. The method of claim 36, wherein the particles are substantially ellipsoidal and the average size is based on an average length of the major axis.

39. The method of claim 29, wherein the particles are hydrophobic and oleophilic.

40. The method of claim 29, wherein the polymer is selected from the group consisting of polysulfone (PSF), poly(vinylpyrrolidone) (PVP), polyacrylonitrile (PAN), polycarbonate, polyethersulfone (PES), and any combination thereof.

41. The method of claim 29, wherein the polymer comprises polysulfone (PSF).

* * * * *